United States Patent [19]
Reither

[11] Patent Number: 6,147,128
[45] Date of Patent: *Nov. 14, 2000

[54] INDUSTRIAL FABRIC AND YARN MADE FROM RECYCLED POLYESTER

[75] Inventor: John R. Reither, Summerville, S.C.

[73] Assignee: AstenJohnson, Inc., Charleston, S.C.

[*] Notice: This patent issued on a continued prosecution application filed under 37 CFR 1.53(d), and is subject to the twenty year patent term provisions of 35 U.S.C. 154(a)(2).

[21] Appl. No.: 09/078,738

[22] Filed: May 14, 1998

[51] Int. Cl.$^7$ .................................................. C08J 11/04
[52] U.S. Cl. .................................................. 521/48
[58] Field of Search .......................... 521/41, 48

[56] References Cited

U.S. PATENT DOCUMENTS

| | | | |
|---|---|---|---|
| 3,193,522 | 7/1965 | Neumann et al. | 524/195 |
| 3,852,101 | 12/1974 | Batchelor | 117/138.8 |
| 3,975,329 | 8/1976 | Barnewall et al. | 525/437 |
| 4,064,103 | 12/1977 | Cordes | 260/45.9 |
| 4,499,219 | 2/1985 | Buxbaum | 524/94 |
| 5,246,992 | 9/1993 | Wick et al. | 524/195 |
| 5,532,065 | 7/1996 | Gubitz | 428/480 |
| 5,554,657 | 9/1996 | Brownscombe | 521/48 |
| 5,582,788 | 12/1996 | Collette | 264/297.2 |
| 5,863,480 | 1/1999 | Suwanda | 264/209.8 |
| 5,876,644 | 3/1999 | Nichols | 264/101 |
| 5,889,096 | 3/1999 | Imashiro | 524/195 |

FOREIGN PATENT DOCUMENTS

| | | |
|---|---|---|
| 0417717 | 4/1996 | European Pat. Off. . |
| 1-15604 | 3/1989 | Japan . |
| 0621135 | 1/1981 | Switzerland . |
| 1231975 | 5/1971 | United Kingdom . |
| 1330036 | 9/1973 | United Kingdom . |
| 1485294 | 9/1977 | United Kingdom . |
| 8301253 | 4/1983 | WIPO . |

*Primary Examiner*—Paul R. Michl
*Attorney, Agent, or Firm*—Volpe and Koenig, P.C.

[57] ABSTRACT

A polymer blend of fresh polymer, recycled polymer, polymeric stabilizer, wherein the recycled polymer comprising a carboxyl end group, and the polymeric stabilizer is reactive with such a carboxyl end group; also a yarn or fiber made from such a blend and an industrial fabric, especially a papermaker's fabric, made from such a yarn or fiber; also the process of making such a yarn or fiber.

20 Claims, 9 Drawing Sheets

INDUSTRIAL FABRIC AND YARN MADE FROM RECYCLED POLYESTER

The present invention relates generally to industrial fabrics and more particularly to papermaking fabrics which must exhibit excellent heat stability and hydrolysis resistance.

BACKGROUND OF THE INVENTION

Generally in the process for making paper, incremental amounts of liquid are removed from a slurry of pulp in a succession of steps. In a first forming step, the slurry is deposited on a porous forming fabric which drains much of the liquid by gravity and suction, and leaves a wet web of solids on the fabric surface. In a later pressing step, the wet web is compressed while on a press fabric in order to removed additional liquid. In a still later, drying step, more liquid is removed by evaporation, usually by supporting the web on a dryer fabric so that the web is in contact with large diameter, smooth, heated rolls.

The papermaking process places considerable demands on the fabrics used in each process step. The fabric should be structurally strong, flexible, abrasion resistant, chemical resistant, and able to withstand any temperatures for extended times.

A major improvement in the technology of papermaking fabric has been the introduction of synthetic polymer monofilaments. A suitable polymer must provide a yarn having chemical and physical properties which satisfy the requirements of automated fabric manufacturing and the demands of papermaking.

Monofilaments have been made from such polymers as polyethylene terephthalate (PET). PET has good dimensional stability, reasonable resistance to abrasion and is moderately priced. However, it has marginable hydrolytic stability and it degrades rapidly in the presence of caustic solution.

The cost of a yarn can be decreased by including a certain amount of recycled PET. However the addition of such recycled material decreases the hydrolytic stability of the yarn and further decreases its dry heat stability.

SUMMARY OF THE INVENTION

The present invention provides a polymer blend for forming a yarn, the blend comprising recycled polymer, fresh polymer, and polymeric stabilizer. The fresh polymer is one that was not been previously part of a yarn, fiber, or fabric. The recycled polymer is a polyester that was previously part of a yarn, fiber, or fabric. The recycled polymer polyester has an unreacted carboxyl end group and the polymeric stabilizer is one that will react with the unreacted carboxyl end group. Yarns made from such a blend and fabrics, especially papermaking fabrics, made from such yarns are also part of the invention. In a related aspect, the invention includes a process for making the yarn.

DETAILED DESCRIPTION OF THE PREFERRED EMBODIMENTS

Figure 1:
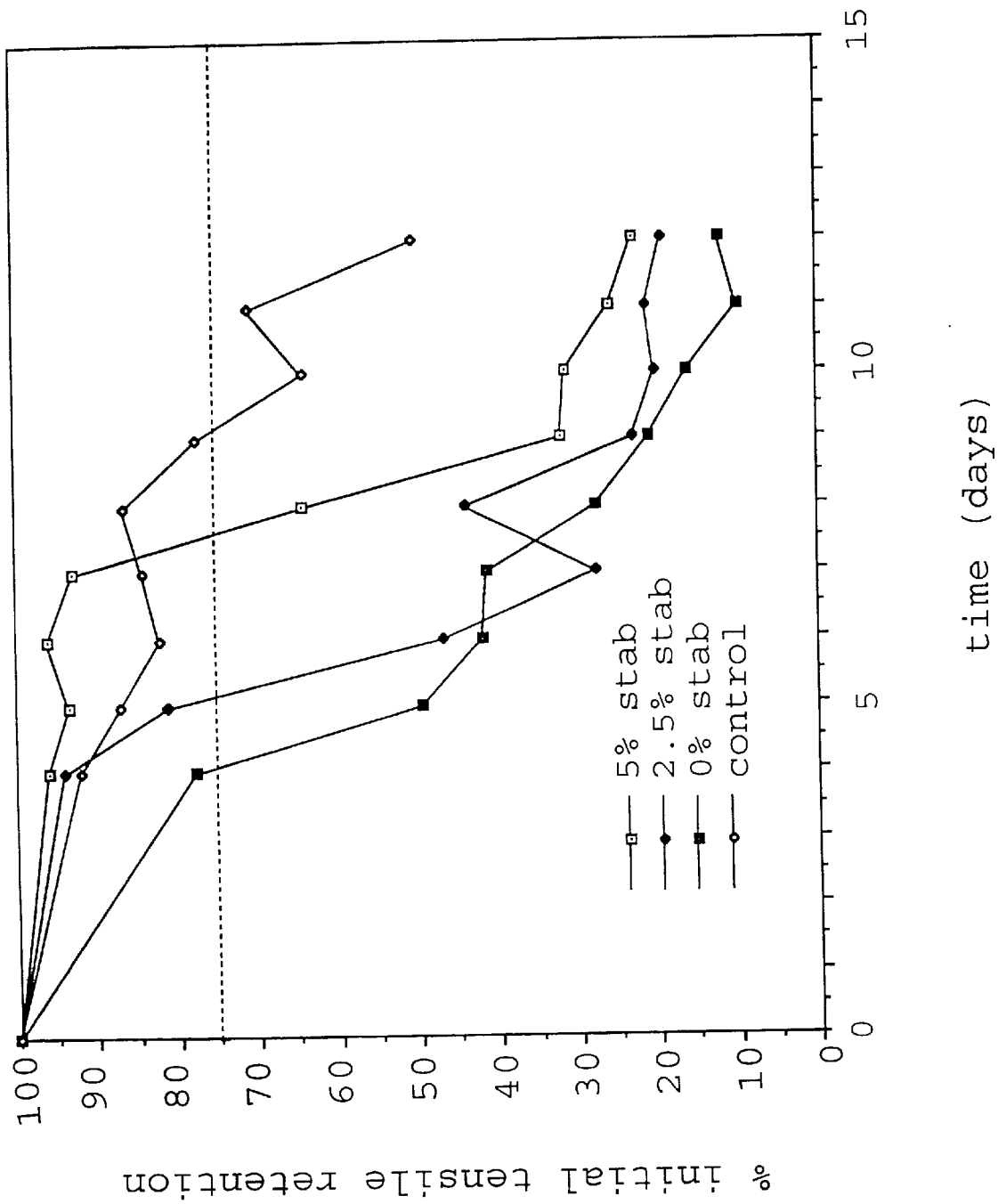
FIG. 1 presents in graph form the percent tensile strength retention as a function of time at 350° F. Shown are data for the control yarn, for yarn made with 13.5% recycled polymer and 0% Stabaxol KE7646, for yarn made with 13.5% recycled polymer and 2.5% Stabaxol KE7646, and yarn made with 13.5% recycled polymer and 5% Stabaxol KE7646.

Preferably the fresh polymer is a polyester. In particular embodiments, the recycled and fresh polymers are the same type of polyester (e.g. both are PET). Fresh polymer is polymer that has not previously been part of a yarn, fiber or fabric. Recycled polymer is polymer that was previously part of a yarn, fiber or fabric.

The recycled polyester in the yarn-forming blend is preferably an aromatic dicarboxylic acid polymer. An aromatic dicarboxylic acid polymer is a polymer that comprises one or more aromatic dicarboxylic acids as repeating moieties within the polymer, wherein two successive aromatic dicarboxylic moieties are optionally separated by a linker moiety. It is preferred that successive aromatic dicarboxylic acid moieties are separated from each other by a linker moiety that is a dialkycycloalkyl, alkyl or alkene moiety. It is even more preferred that the linker moiety is selected from the group consisting of di($C_1$ to $C_6$ alkyl) cyclohexane, $C_1$ to $C_6$ alkyl, or $C_1$ to $C_6$ alkene.

In a particular aspect of the invention, the polymer blend is used to form a yarn for use in papermakers' fabrics.

The preferred aromatic dicarboxylic acid polymers for the present invention, PET, PBT, PMT, PEN, and PCTA, are discussed in more detail below.

Polyethylene terephthalate (PET) is a polymer wherein the linker group, when in the polymer, is considered herein to be a $C_2$ alkyl group, an alkyl group with two carbon atoms. PET is available as Crystar Merge 1929 from Du Pont.

Polybutylene terephthalate (PBT), is available as Valox 320 from General Electric and as Celanex 1600 from Hoechst Celanese.

Polytrimethylene terephthalate (PTT), is available from Shell Chemical;

Polyethylene naphthalate (PEN), which is made from 2,6-naphthalene dicarboxylic acid, is available from Eastman Chemicals.

PCTA is a copolyester made substantially of two repeating units. One repeating unit (I) is copolymerized cyclohexane-1,4-dimethanol (CHDM) and copolymerized terephthalic acid. The second repeating unit (II) is copolymerized CHDM and a copolymerized aromatic dicarboxylic acid, especially isophthalic acid or phthalic acid, other than terephthalic acid. The ratio of I to II is most preferably between 0.90 and 0.99. PCTA production is discussed in U.S. Pat. No. 2,901,466. PCTA is available as Thermx 13319 from Eastman Chemical.

"$C_1$ alkyl" refers to an alkyl moiety with one carbon atom, "$C_2$ alkyl" refers to an alkyl moiety with two carbon atoms, and so on.

"Cycloalkyl" refers to a nonaromatic cycloalkyl moiety, especially cyclopentyl or cyclohexyl.

Aromatic moieties of aromatic dicarboxylic acid esters are preferably single ring (benzene) or two rings (naphthalene).

Recycled polymer of particular interest is polymer that had previously been part of a monofilament woven into a papermaker's fabric. Such a fabric may have been used in the forming, press, or dryer section of a papermaking machine.

In preferred polymer blends, the recycled polymer, on a weight basis, preferably accounts for at least 10% but less than 30% of the polymer blend.

Yarn made with polymer blends in which recycled polymer accounts for 30% of the total polymer has been found to be brittle.

The polymeric stabilizer accounts for preferably between 0.75% and 1.5%, more preferably about 1.1%, of the polymer blend.

Preferred polymeric stabilizers are polycarbodiimides, polycarbonates, and bisoxazolines. Polymeric stabilizers are those with a degree of polymerization of at least 5. It is preferred that the degree of polymerization be at least 10; more preferably at least 40.

Examples of monocarbodiimides and biscarbodiimides are aryl-, alkyl-, and cycloalkyl-carbodiimides. They include N,N'-(di-o-tolyl)-carbodiimides and N,N'-(2,6,2',6'-tetraisopropyl)-diphenyl-carbodiimide.

Examples of polycarbodiimides are ones in which carbodiimide moieties are linked to each other by aryl nuclei (e.g. phenylene, napthylene, and diphenylene), which nuclei include benzene moieties substituted by isopropyl moieties in the O-position relative to the carbodiimide groups; i.e., in the 2,6- or 2,4,6-position of the benzene moiety.

Polycarbonates include carbonate polymers of dihydric phenols as well as carbonate copolymers of glycols, and include carbonate polymers with recurring units (—O—A—O—CO—) where CO is C=O and A is a divalent aromatic radical of a diihydric phenol, such as 4,4'-isopropylidenebisbenzenol (bisphenol A).

Bisoxazolines phenylene-bisoxazolines that are unsubstituted or alkyl-, cycloalkyl-, or aryl-substituted, and include, for example, 1,4-phenylene-bis-Δ2-oxazoline-2, 1,3-phonylene-bis-Δ2-oxazoline-2, and 1-methyl-3,5-phenylene-bis(5-methyl-Δ2-oxazoline-2.

It is presently believed that the reason for the increased heat stability and hydrolysis resistance is the increased number of reactions between the carboxyl group of the recycled polyester and the stabilizer as the polymer blend is being processed into a monofilament yarn.

It is preferred that a monomeric stabilizer also be part of the polymer blend. Preferred monomeric stablizers are monomeric carbodiimides and biscarbodiimides. They preferably account for 0.2% to 3.5% of the blend, more preferably 2.0% to 2.5% of the polymer blend, and most preferably 2.0% of the blend. N,N'-(2,6,2',6'-tetraisopropyl)-diphenyl-carbodiimide is a highly preferred monomeric carbodiimide and is also a biscarbodiimide.

"Stabaxol KE7646" was, in all the examples, Stabaxol masterbatch KE7646 from Rhein-Chemie, Rheinhausen, Germany, and consisted of 15% polycarbodiimide in poly (ethylene terephthalate). The polycarbodiimide is an aromatic polycarbodiimide which contains benzene nuclei substituted with isopropyl groups in the o-position, i.e. in the 2,6 positions or 2,4,6 positions, primarily the latter positions relative to the carbodiimide groups. The degree of polymerization was approximately 42.

Stabaxol I was, in all examples, Stabaxol I from Rhein-Chemie, Reinhausen, Germany and consisted of 100% monocarbodiimide. The monocarbodiimide was 2,2',6,6' tetraisopropyl diphenyl carbodiimide.

Preparation of Monofilament Used in the Examples

The fresh polymer in Examples 1–4 was PET purchased as T-026 resin from Hoechst, which resin had an intrinsic viscosity of 0.74.

The recycled PET polymer in Examples 1–4 was PET from extruded monofilament pieces that had been processed through a Buss Condux densifier to become irregular granules that nevertheless fed consistently into a gravimetric blender.

Monofilament yarn of the present invention was prepared using conventional monofilament production equipment. Fresh and recycled PET polymer, Stabaxol I, and Stabaxol KE7646, were supplied as particles in granular or pellet form. Recycled polymer was dried at 100° C. prior to use because the presence of moisture apparently caused a decrease in the intrinsic viscosity of the recycled polymer from almost 0.7 to about 0.4 with a detrimental effect on its properties.

The proportions of the particles were controlled by a gravimetric blender. The particles were meltblended. The melt was filtered through a screen pack, extruded through a multihole die, quenched to produce strands, drawn and heatset to the final form monofilament.

The meltblend phase included passage through four barrel zones in sequence, a barrel neck, a pump, a screen pack, and the front and back of the multi-hole die, each of whose temperatures was monitored and was in the range 490 to 550° F.

Quenching was done in a water bath. The strands were drawn through three ovens in sequence. The ovens were separated by a "cold zone", which was a zone at room temperature about 25° C. The four godets were used to control the draw ratios, which ratios were generally 4.5:1, and the final relaxation, which was generally 16%. The godets were located before the first oven, in the two cold zones, and after the third oven.

Conversion of Monofilament to Industrial Fabric

The monofilament yarn of the present invention can be made into industrial fabric by conventional methods. It can be woven on looms in the traditional warp and fill fabric structure or formed into spiral structures in which parallel spiral monofilaments are intermeshed with pintle yarns. The fabric of this invention can be formed exclusively from the novel monofilament or from the novel monofilament in combination with other materials. A preferred use for the fabric of this invention is in papermaking machines.

Tests Used in the Examples to Measure Filament Properties

Tensile strength and related properties were measured on a tensile testing machine operated with a ten (10) inch/minute jaw separation rate and with a maximum load of 100 pounds.

Elongation was measured as the percent increase in length at a fiber loading of 1.75 g/d.

Elongation was also measured at a fiber loading of 1.0 pound.

Tenacity, in grams/denier, was measured as the normalized tensile force required to break a single filament.

Breaking strength was measured as the tensile force required to break a single filament.

Breaking energy, in kg-mm, was measured as the area under the stress strain curve.

Breaking elongation was measured as the percentage increase in length at the tensile force required to break a single filament.

Knot strength was the tensile force necessary to break an overhead knotted filament.

Knot elongation was measured as the percentage increase in length at the break point of the knot. This is a measure of the toughness of the yarn.

For the loop strength measurement, interlocking loops were formed with two monofilaments and the ends of each monofilament were clamped in the jaws of a tensile tester. Loop strength was the force necessary to break the interlocked loops.

Loop elongation was measured as the percentage increase in length at the point at which the yarn breaks in the loop configuration.

Modulus was measured as the slope of the stress/strain curve at one percent (1%) strain.

Knot strength, knot elongation, loop strength, loop elongation, and modulus were each measured in a manner consistent with ASTM test D2256.

Free shrink was measured as percent dimensional change after unrestrained exposure to 204° C. for 15 minutes.

Bomb hydrolysis was measured as percent tensile strength retained after exposure to 84 psi in an atmosphere of saturated steam at 325° F. for 5.2 hours.

Pot hydrolysis was measured as percent tensile strength retained after exposure to 15 psi in an atmosphere of saturated steam at 250° F. for the number of days specified.

Dry heat stability was the percent tensile strength retained after exposure to 350° F. for the number of days specified.

Abrasion testing was performed at room temperature (25° C.) and ambient humidity (50%) by suspending a 200 g or 500 g weight from the end of a sample filament draped in an arc contacting with the surface of a revolving "squirrel cage" cyclinder. The surface of the "squirrel cage" was comprised of approximately 36 evenly spaced 24 gauge, stainless steel wires. Abrasion resistance was measured as the number of revolutions, at a constant rotation speed, required to cause the sample filament to break.

Yellowness was measured as yellowness index.

EXAMPLES

The present invention will be more fully understood by reference to the following representative examples. Therein, all parts, proportions and percentages are by weight unless otherwise indicated.

Example 1

The purpose of this trial was to evaluate the use of recycled polymer in combination with 2.5% or 5.0% Stabaxol KET646 in 0.8 mm dryer monofilament.

In this example, the recycled polymer was blended in at an approximately 13.5% level. Three different levels of Stabaxol KE7646 were evaluated. The 3 levels were 5.0%, 2.5% and 0% (0.75%, 0.375%, and 0% polycarbodiimide).

Relative amounts, on a weight basis, of the components of the yarns tested are shown in Table 1.

TABLE 1

| Yarn | Fresh PET | Recycled PET | Stabaxol I (monomer) | Stabaxol KE7646 Masterbatch |
|---|---|---|---|---|
| Control | 97.5% | 0 | 2.5% | 0 |
| 0% Stabaxol KE7646 | 84% | 13.5% | 2.5% | 0 |
| 2.5% Stabaxol KE7646 | 81.5% | 13.5% | 2.5% | 2.5% |
| 5% Stabaxol KE7646 | 79.0% | 13.5% | 2.5% | 5.0% |

No major processing problems were encountered during the run. In this run, but not others, some pack pressure build-up was noticed, for example up to about 2100 psi after about 20 hrs on steam exposure. The build up may have been partly due to the presence of black pigment in the blend.

The key yarn properties are shown in Table 2 below. There were some slight differences in the yarns. The breaking energy was 10% lower for the yarn containing recycled polymer, most likely due to a lower breaking elongation. Also the control yarn had a significantly higher abrasion resistance than the yarn containing recycle. For the last 12 runs of 0.8 mm yarn, the 95% confidence interval for the measured abrasion resistance was 8574–9967. Therefore, the difference in the abrasion resistance between the control yarn and the yarn containing recycled polymer was significant. As the abrasion resistance is directly proportional to the molecular weight of the yarn, it can be concluded that the addition of recycled polymer decreases the molecular weight of the finished yarn. The loop strength and knot strength of the yarns was also measured. The loop strength and knot strength for the yarn that contain recycled polymer appeared to be close to those of the yarn made without recycled polymer. The elongation during the measurement of knot strength was slightly lower with the yarn containing recycled polymer. Also the loop elongation was lower as well. This was consistent with the results for breaking elongation and breaking energy. The yarn made with recycled polymer was slightly less ductile than the yarn made without recycled polymer. In a filling yarn of this size the lower ductility should not pose a problem.

TABLE 2

Comparison of yarn properties

| yarn property | control | 0% stabaxol KE7646 | 2.5% stabaxol KE7646 | 5% stabaxol KE7646 |
| --- | --- | --- | --- | --- |
| diameter | 0.7963 mm | 0.8010 mm | 0.7987 mm | 0.8075 mm |
| denier | 6469 | 6282 | 6267 | 6407 |
| elongation @ 1.75 g/d | 18.2% | 17.6% | 17.8% | 18.0% |
| elong @ 3.0 g/d | 30.4% | 28.6% | 28.8% | 28.9% |
| break energy | 1457 kg-mm | 1276 kg-mm | 1301 kg-mm | 1294 kg-mm |
| tenacity | 3.50 g/d | 3.51 g/d | 3.54 g/d | 3.49 g/d |
| breaking elongation | 41.7% | 38.4% | 38.9% | 38.5% |
| modulus | 46.9 g/d | 50.2 g/d | 47.8 g/d | 49.9 g/d |
| elongation @ 1.0 pounds | 0.15% | 0.14% | 0.15% | 0.14% |
| abrasion (ctb) | 10116 | 7583 | 6717 | 7902 |
| free shrink | 6.2% | 6.3% | 6.2% | 6.5% |
| bomb hydrolysis | 88.8% | 84.5% | 86.4% | 89.2% |
| yellowness | 11.7 | 10.5 | 12.9 | 15.6 |
| knot strength | 37.7 lbs | 35.9 lbs | 36.0 lbs | 38.0 lbs |
| knot elongation | 39.9% | 32.0% | 32.5% | 36.3% |
| loop strength | 74.0 lbs | 73.6 lbs | 75.5 lbs | 73.0 lbs |
| loop elongation | 30.8% | 28.5% | 29.4% | 28.5% |

FIG. 1 shows the dry heat stability at 350° F. The yarn containing recycled polymer had less dry heat stability than the control yarn. As increased levels of Stabaxol KE7646 were added the dry heat stability increased. The yarn with no added Stabaxol KE7646 had a 3/4 life of 4 days. The yarn made with 2.5% Stabaxol KE7646 (0.375% polycarbodiimide) had a 3/4 life of 5.5 days. The yarn with 5% Stabaxol KE7646 (0.75% polycarbodiimide) had a 3/4 life of 8 days. The control yarn had a 3/4 life of 9.5 days. It was concluded that the dry heat stability of the yarn was improved significantly by the addition of polycarbodiimide, which was useful but not to the extent necessary to equal the heat stability of yarn made exclusively with fresh PET.

Figure 2:
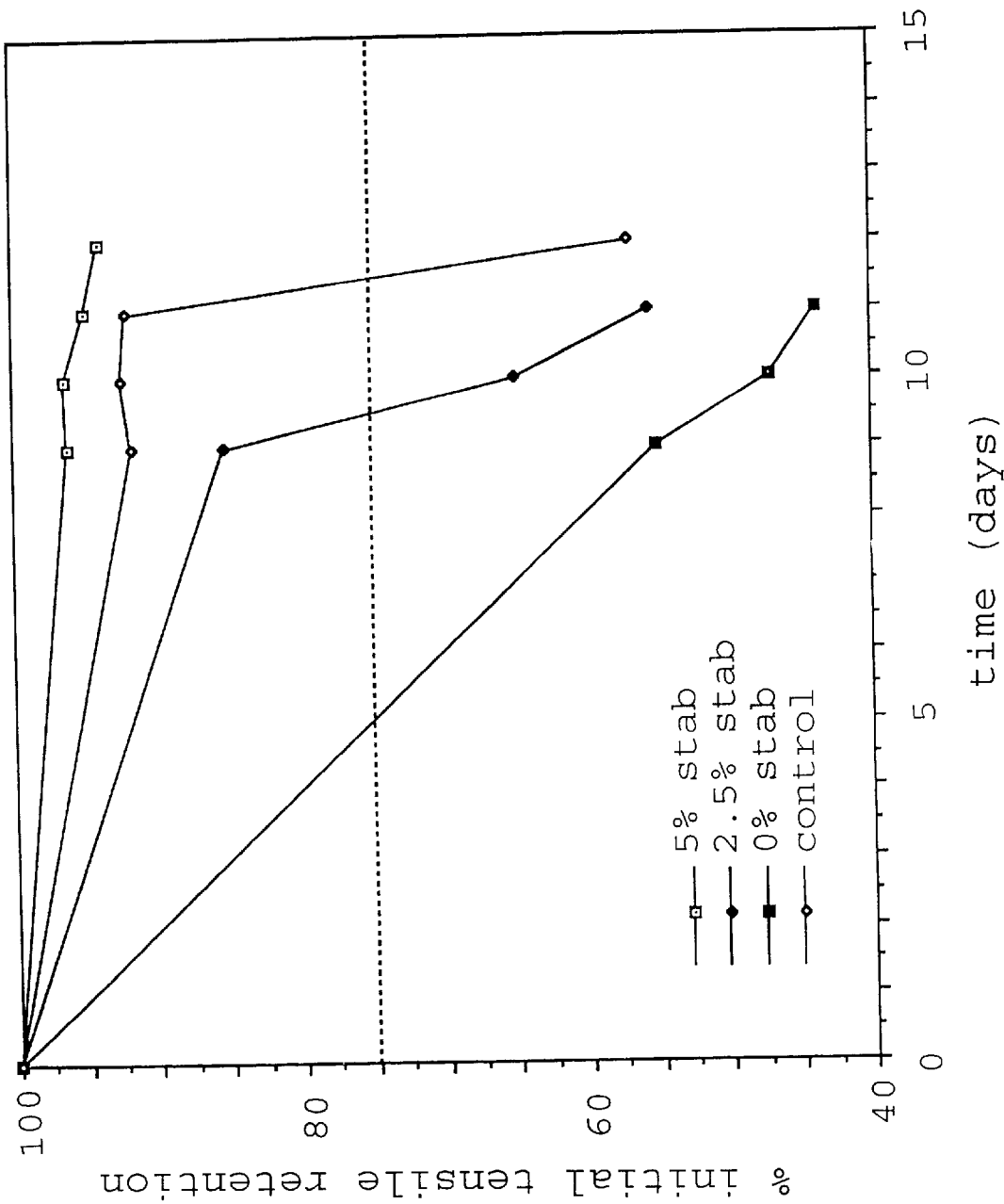
FIG. 2 presents in graph form the percent tensile strength retention as a function of time in the pot hydrolysis test. Shown are data for the control yarn, for yarn made with 13.5% recycled polymer and 0% Stabaxol KE7646, for yarn made with 13.5% recycled polymer and 2.5% Stabaxol KE7646, and for yarn made with 13.5% recycled polymer and 5.0% Stabaxol KE7646.

The hydrolysis resistance of the trial yarns as measured in the pot hydrolysis test are shown in FIG. 2. The hydrolysis resistance of the yarn made with recycled polymer and 5% Stabaxol KE7646 (0.75% polycarbodiimide) was better than that of the control sample. However, when less than 5% Stabaxol KE7646 was added, the hydrolysis resistance dropped off rapidly.

Example 2

The purpose of this example was to produce samples of a 1.0 mm monofilament yarn using 10–20% recycled fiber content.

Relative amounts, on a weight basis, of the components of the yarns tested are shown in Table 3.

TABLE 3

| Yarn | Fresh PET | Recycled PET | Stabaxol I (monomer) | Stabaxol KE7646 Masterbatch |
| --- | --- | --- | --- | --- |
| Control | 97.5% | 0 | 2.5% | 0 |
| Trial 1 | 75% | 10% | 2.5% | 2.5% |
| Trial 2 | 74% | 10% | 2.5% | 3.5% |
| Trial 3 | 75% | 20% | 2.5% | 2.5% |
| Trial 4 | 74% | 20% | 2.5% | 3.5% |

Results

Figure 3:
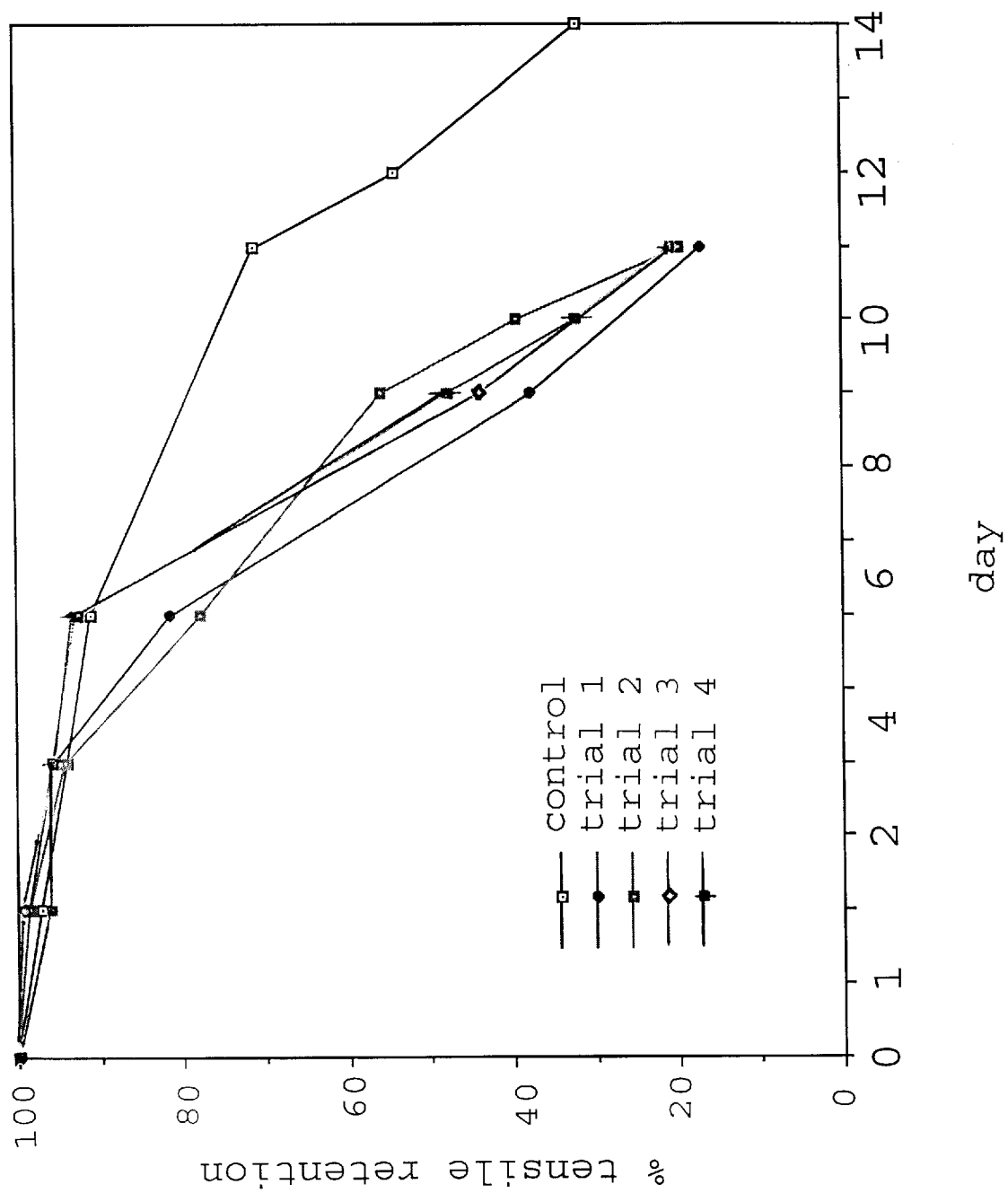
FIG. 3 presents in graph form the percent tensile strength retention as a function of number of days at 350° F. (dry heat stability). Shown are the data for the control yarn, for yarn made with 10% recycled polymer and 2.5% Stabaxol KE7646 (trial 1), for yarn made with 10% recycled polymer and 3.5% Stabaxol KE7646 (trial 2), for yarn made with 20% recycled polymer and 2.5% Stabaxol KE7646 (trial 3), and for yarn made with 20% recycled polymer and 3.5% Stabaxol KE7646 (trial 4).

Dry heat stability of yarn made with recycled polymer was lower than yarn made with fresh polymer (control sample). The results are summarized in FIG. 3. The control sample had a 3/4 life of 10 days. The best yarn with recycle had a 3/4 life of 7 days.

Figure 4:
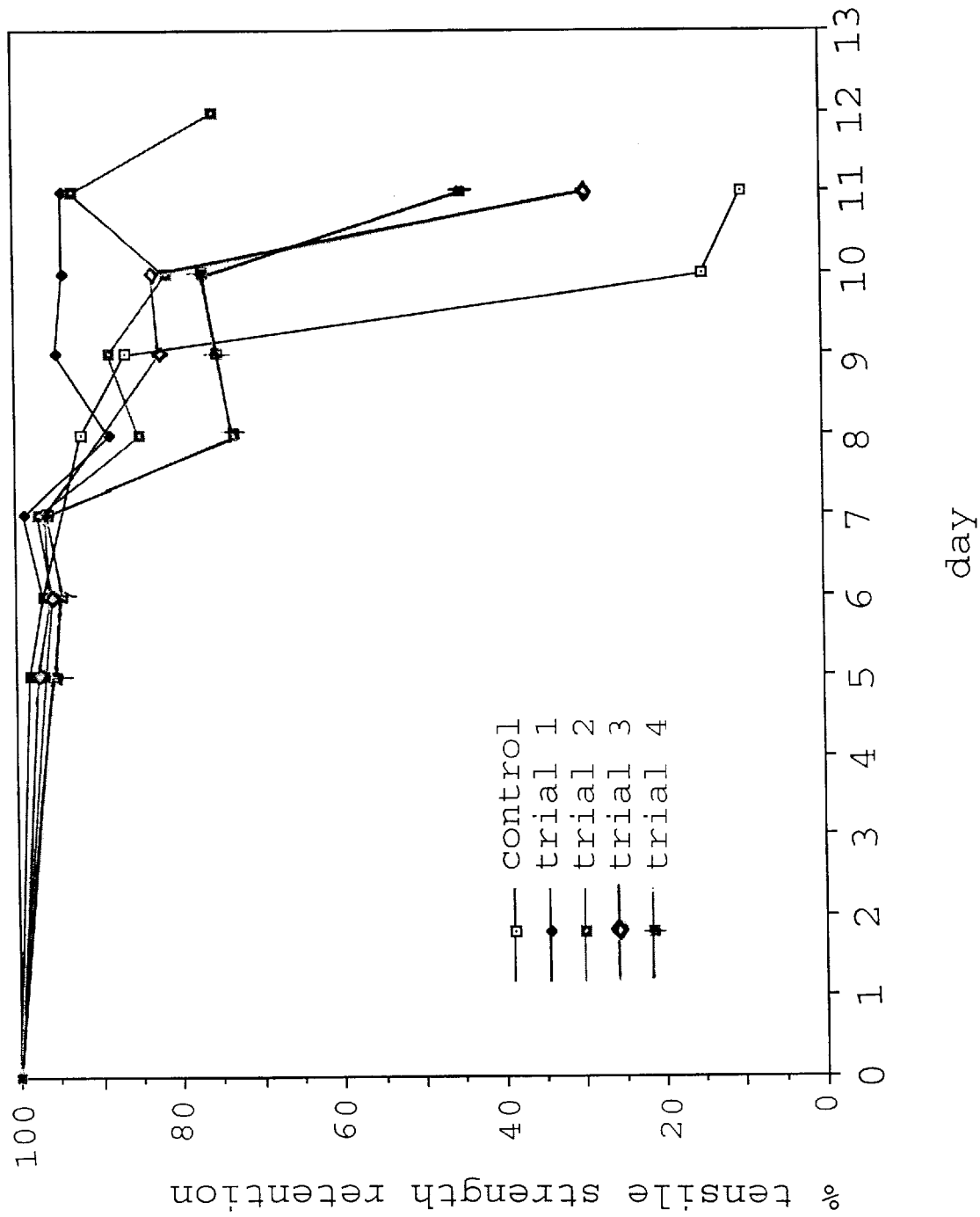
FIG. 4 presents in graph form the percent tensile strength retention as a function of time under conditions for pot hydrolysis. Shown are the data for the control yarn, for yarn made with 10% recycled polymer and 2.5% Stabaxol KE7646 (trial 1), for yarn made with 10% recycled polymer and 3.5% Stabaxol KE7646 (trial 2), for yarn made with 20% recycled polymer and 2.5% Stabaxol KE7646 (trial 3), and for yarn made with 20% recycled polymer and 3.5% Stabaxol KE7646 (trial 4).

Hydrolysis was not a problem. All but 2 of the 8 samples had a days to 3/4 life of greater than that of the control. This is shown in FIG. 4.

The mechanical properties of the yarn were very similar to that of the control yarn. These properties are summarized in Table 4. As the level of recycle was increased, the mechanical properties (tenacity, breaking elongation, breaking energy) generally tended to decrease but the decreases were not significant.

The abrasion resistance of the yarn made with recycled polymer was lower than that of the control sample. The control sample had an abrasion resistance of 4500 cycles to break. The yarns made with recycled polymer had abrasion resistance from 3200 to 3800 cycles to break.

TABLE 4

Recycle Yarn Properties Summary

| property | control | trial 1 | trial 2 | trial 3 | trial 4 |
| --- | --- | --- | --- | --- | --- |
| denier | 9675 | 9640 | 9660 | 9612 | 9592 |
| elongation @ 1.75 | 14.8% | 15.1% | 15.4% | 15.6% | 15.6% |
| elongation @ 3.0 g/d | 28.7% | 29.9% | 30.5% | 30.9% | 31.2% |
| breaking energy | 2079 kg-mm | 1897 kg-mm | 1942 kg-mm | 1896 kg-mm | 1913 kg-mm |
| tenacity | 3.2 g/d | 3.2 g/d | 3.2 g/d | 3.1 g/d | 3.1 g/d |
| break strength | 69.1 lbs | 67.4 lbs | 67.0 lbs | 66.5 lbs | 66.2 lbs |
| breaking elongation | 38.7% | 37.1% | 38.0% | 37.6% | 37.9% |
| modulus | 52.1 g/d | 53.5 g/d | 52.9 g/d | 52.4 g/d | 52.3 g/d |
| elongation @ 1 pound | 0.03% | 0.04% | 0.04% | 0.06% | 0.5% |
| free shrinkage | 6.9% | 6.5% | 6.5% | 6.2% | 6.1% |
| bomb hydrolysis | 91.9% | 89.1% | 91.6% | 89.4% | 88.7% |
| pot hydrolysis | 9.1 days | 11.4 days | 12.0 days | 10.2 days | 8.0 days |
| abrasion | 4538 ctb | 3811 ctb | 3350 ctb | 3419 ctb | 3260 ctb |
| heat stability (3/4 life) | 10.0 days | 6.5 days | 6.4 days | 7.1 days | 7.2 days |

Example 3

Example 2 describes a yarn containing 20% recycle that had acceptable hydrolysis resistance. In this example, more Stabaxol (polymeric Staboxal) was added than in Example 2 in an effort to increase the dry heat stability. The yarn had a diameter of 1.0 mm.

Relative amounts, on a weight basis, of the components of the yarns tested are shown in Table 5.

TABLE 5

| Yarn | Fresh PET | Recycled PET | Stabaxol I (monomer) | Stabaxol KE7646 Masterbatch |
|---|---|---|---|---|
| Control | 97.5% | 0% | 2.5% | 0% |
| Trial 1 | 82.5% | 10% | 2.5% | 5% |
| Trial 2 | 75% | 10% | 2.5% | 7.5% |
| Trial 3 | 72.5% | 20% | 2.5% | 5% |
| Trial 4 | 70 | 20% | 2.5% | 7.5% |

Figure 6:
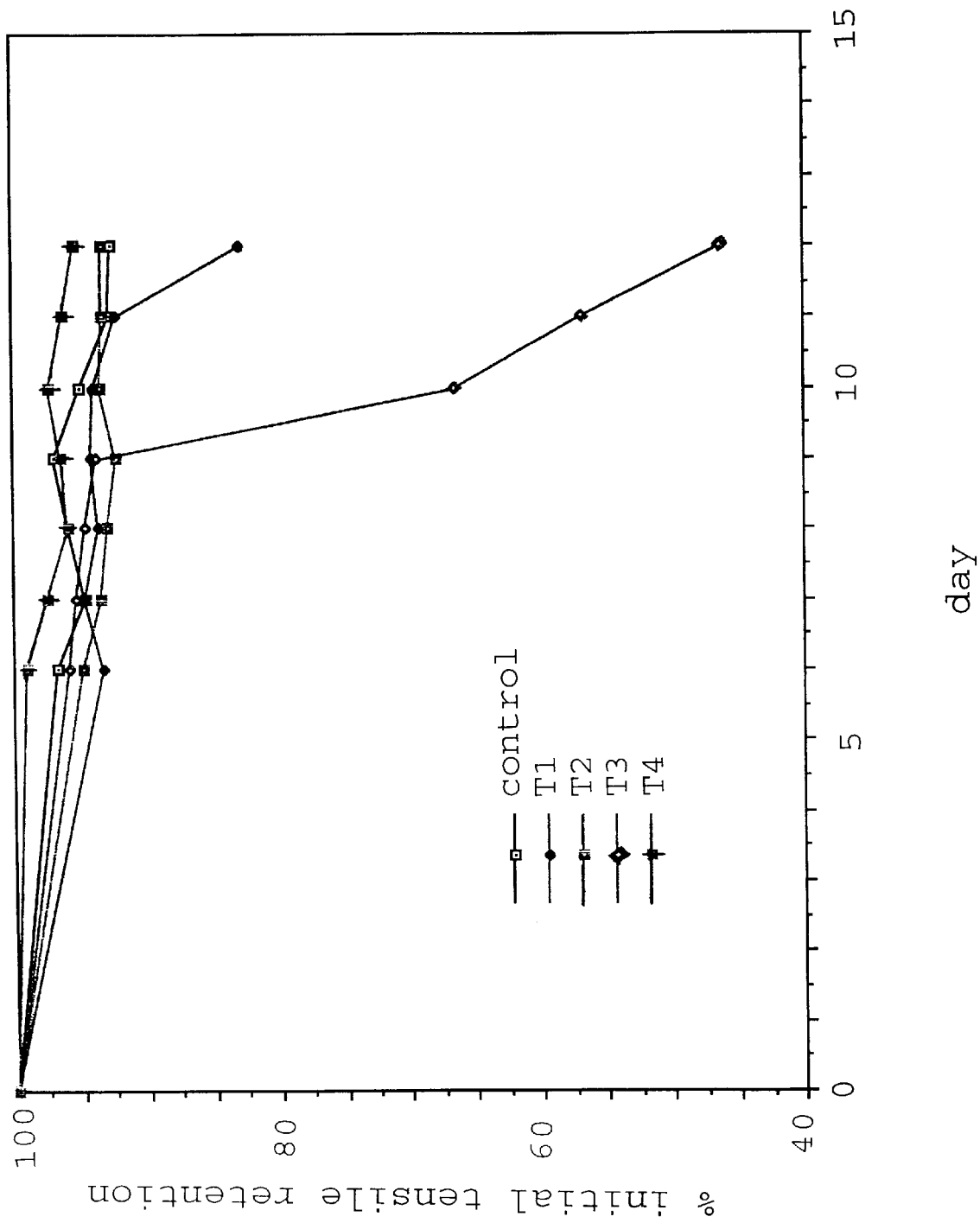
FIG. 6 presents in graph form the percent tensile strength retention as a function of number of days at 250° F. in the pot hydrolysis test for yarns with and without recycled polymer. Shown are the data for the control yarn, for yarn made with 10% recycled polymer and 5.0% Stabaxol KE7646 (T1), for yarn made with 10% recycled polymer and 7.5% Stabaxol KE7646 (T2), for yarn made with 20% recycled polymer and 5.0% Stabaxol KE7646 (T3), and for yarn made with 20% recycled polymer and 7.5% Stabaxol KE7646 (T4).

The following observations were made:

The hydrolysis resistances of all of the samples were very good. Trials 1 and 3 separated out slightly. These were the samples that had the lowest amount of Stabaxol KE7646 added. The samples run with 7.5% Stabaxol KE7646 (1.1% polycarbodiimide), had a hydrolysis resistance equal to that of the control sample. See FIG. 6.

Figure 5:
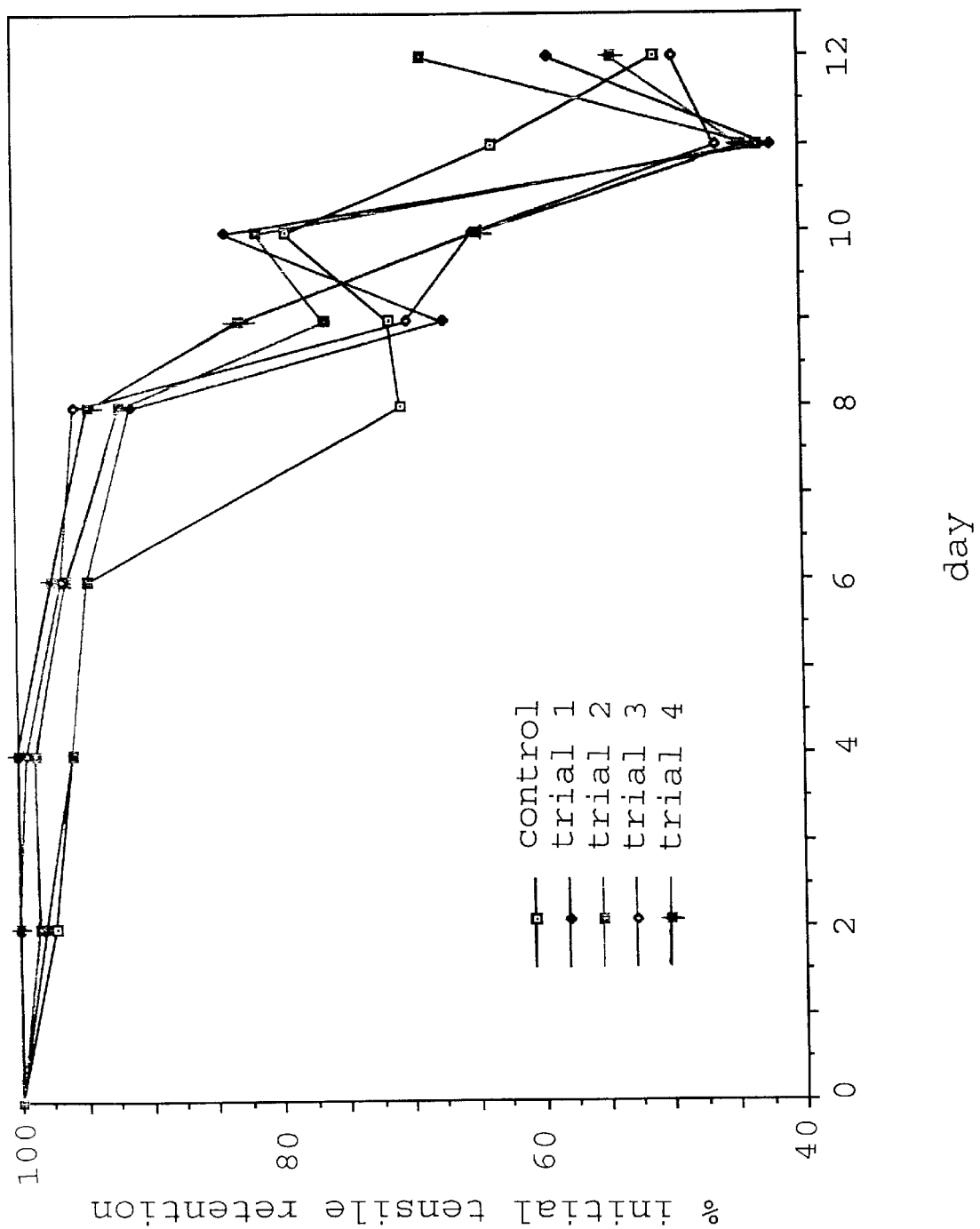
FIG. 5 presents in graph form the percent tensile strength retention as a function of number of days at 350° F. (dry heat) for yarns with and without recycled polymer. Shown are the data for the control yarn, for yarn made with 10% recycled polymer and 5% Stabaxol KE7646 (trial 1), for yarn made with 10% recycled polymer and 7.5% Stabaxol KE7646 (trial 2), for yarn made with 20% recycled polymer and 5.0% Stabaxol KE7646 (trial 3), and for yarn made with 20% recycled polymer and 7.5% Stabaxol KE7646 (trial 4).

Dry heat stability was improved over Example 2. In every case, the yarn made with recycled polymer (and Stabaxol KE7646) had a longer "days to 3/4 life" than the control sample. After 12 days, 3 of the 4 samples had a higher tensile retention than the control sample. FIG. 5 shows this improvement. However, the more recycled polymer that was added to the yarn the lower the dry heat stability after 12 days.

Addition of recycled polymer reduced the abrasion resistance of the yarn, but not to a statistically significant degree.

Breaking energy was not influenced by either the addition of recycle or the addition of Stabaxol KE7646.

The measured breaking strength of the yarn was decreased by both the addition of recycled polymer and Stabaxol KE7646. In neither case, however, was the decrease statistically significant.

The balance of the yarn properties are shown in Table 6.

TABLE 6

Recycle Yarn Properties Summary

| property | control | trial 1 | trial 2 | trial 3 | trial 4 |
|---|---|---|---|---|---|
| denier | 9675 | 9626 | 9681 | 9593 | 9696 |
| elongation @ 1.75 g/d | 14.8% | 15.5% | 15.8% | 15.3% | 16.3% |
| elongation @ 3.0 g/d | 28.7% | 30.6% | 31.4% | 29.5% | 34.2% |
| breaking energy | 2079 kg-mm | 2011 kg-mm | 1890 kg-mm | 1852 kg-mm | 1985 kg-mm |
| tenacity | 3.2 g/d | 3.12 g/d | 3.12 g/d | 3.15 g/d | 3.01 g/d |
| break strength | 69.1 lbs | 66.2 lbs | 66.4 lbs | 66.6 lbs | 64.3 lbs |
| breaking elongation | 38.7% | 39.0% | 37.5% | 36.7% | 39.3% |
| modulus | 52.1 g/d | 51.0 g/d | 51.9 g/d | 51.5 g/d | 49.5 g/d |
| elongation @ 1 pound | 0.03% | 0.07% | 0.05% | 0.06% | 0.07% |
| free shrinkage | 6.9% | 7.4% | 7.6% | 7.4% | 7.5% |
| pot hydrolysis | 12(+) days | 12(+) days | 12(+) days | 9.7 days | 12(+) days |
| abrasion | 4538 ctb | 3932 ctb | 3778 ctb | 3569 ctb | 3790 ctb |

TABLE 6-continued

Recycle Yarn Properties Summary

| property | control | trial 1 | trial 2 | trial 3 | trial 4 |
|---|---|---|---|---|---|
| heat stability (3/4 life) | 7.6 days | 8.7 days | 10.1 days | 8.7 days | 9.4 days |

Example 4

The purpose of this Example was to manufacture a sample of 1.0 mm monofilament yarn containing 20% recycled polymer for evaluation. The compositions of the yarn and a control yarn are shown in Table 3.

For this trial, 7.0% of Stabaxol KE7646 (corresponding to 1.1% polycarbodiimide) was added to the yarn. The cost of this yarn is about 8% less than the same yarn made without recycled polymer.

Relative amounts, on a weight basis, of the components of the yarns tested are shown in Table 7.

TABLE 7

| Yarn | Fresh PET | Recycled PET | Stabaxol KE-7646 | Stabaxol I |
|---|---|---|---|---|
| control | 98 | 0 | 0 | 2.0 |
| 20% recycle | 71 | 20 | 7.0 | 2.0 |

Figure 7:
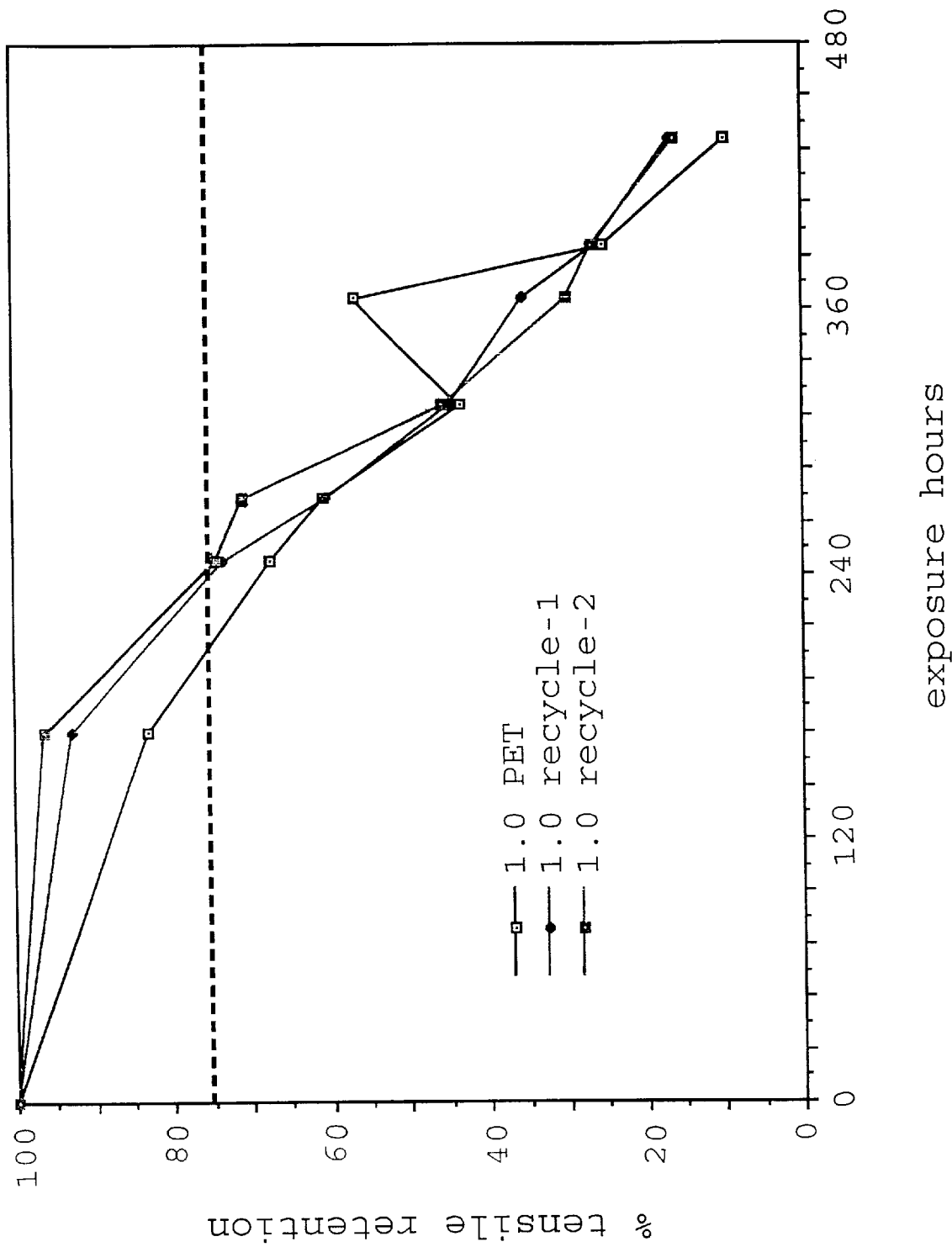
FIG. 7 presents in graph form the percent tensile strength retention as a function of hours of exposure at 350° F. for 1.0 mm PET yarns made with or without 20% recycled polymer. Results are for a PET yarn, (1.0 PET) for a first sample of PET yarn made with 20% recycled polymer, (1.0 recycle-1) and for a second sample of PET yarn with 20% recycled polymer (1.0 recycle-2).

Dry heat stability at 350° F. was equal to or better than that of the control yarn (yarn made without recycled polymer). The yarn containing recycled polymer had a 3/4 life of 10 days (2 different samples) and the control yarn had a 3/4 life of 8.6 days. After about 300 hours exposure there was no difference between the two yarns. See attached FIG. 7.

Figure 8:
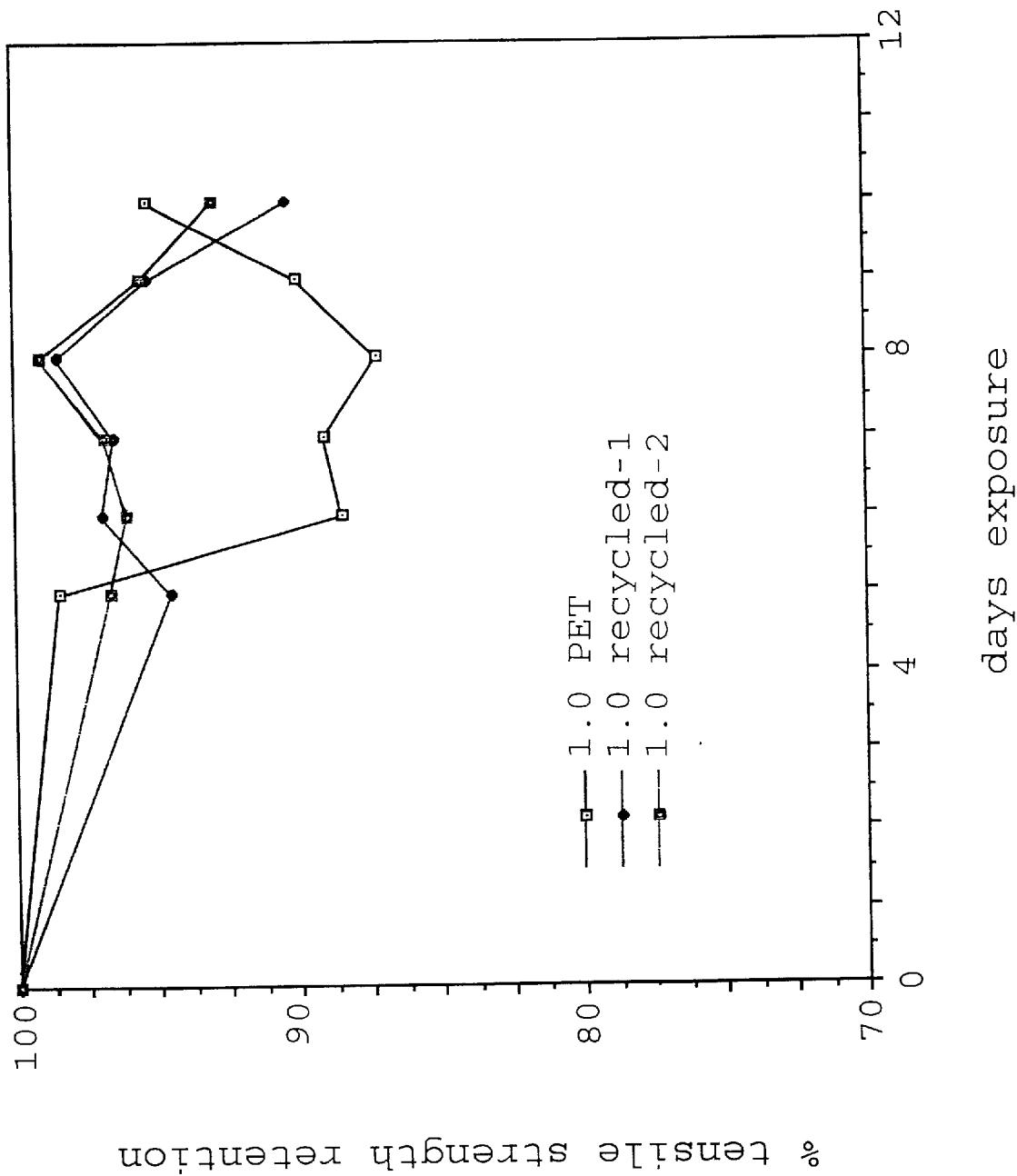
FIG. 8 presents in graph form the percent tensile strength retention as a function of number of days of exposure at 250° F. in the pot hydrolysis test for 1.0 mm PET yarns made with or without 20% recycled polymer. Results are for a PET yarn, (1.0 PET) for a first sample of PET made with 20% recycled polymer, (1.0 recycle-1) and for a second sample of PET yarn made with 20% recycled polymer (1.0 recycle-2).

The hydrolysis resistance of the yarns was very good. The yarn containing recycled polymer had a pot hydrolysis resistance of 10(+) days to 3/4 life. The control sample also had a pot hydrolysis resistance of 10(+) to 3/4 life. This data is shown in FIG. 8.

The addition of recycled polymer reduced the observed abrasion resistance of the yarn. However the reduction was not statistically significant. The 95% confidence interval for 1.0 mm yarn made without recycled polymer (for 6 consecutive production runs) was 3545–4316 cycles to break. The abrasion resistance of the yarn made with recycled polymer fell within this interval (3581 cycles to break).

The balance of the yarn properties are shown in the attached Table 8.

TABLE 8

Recycle Yarn Properties Summary

| yarn Property | control | 1.0 mm yarn with 20% recycle |
|---|---|---|
| denier | 9721 | 9738 |
| elong @ 1.75 g/d | 15.4% | 15.3% |
| elong @ 3.0 g/d | 29.6% | 29.4% |
| breaking energy | 2014 kg-mm | 1866 kg-mm |
| tenacity | 3.19 g/d | 3.19 g/d |
| breaking elongation | 38.4% | 36.3% |
| modulus | 51.3 g/d | 53.1 g/d |

TABLE 8-continued

Recycle Yarn Properties Summary

| yarn Property | control | 1.0 mm yarn with 20% recycle |
|---|---|---|
| elongation @ 1.0 pound | 0.02% | 0.03% |
| free shrink | 6.7% | 6.5% |
| bomb hydrolysis | 89.7% | 89.6% |
| yellowness | 15.9 | 17.3 |
| abrasion resistance | 3931 | 3581 |
| breaking strength | 68.4 pounds | 68.5 pounds |
| knot strength | 50.9 pounds | 51.1 pounds |
| knot elongation | 28.9% | 28.8% |

Example 5

The purpose of this example was to measure the heat stability of fresh PET, in this case PET with an intrinsic viscosity of 0.95 obtained as Crystar 1929 merge from Du Pont. Relative amounts, on a weight basis, of the components of the yarns tested are shown in Table 9.

TABLE 9

| Yarn | Fresh PET | Stabaxol I (monomer) | Stabaxol KE7646 masterbatch | Black Additive |
|---|---|---|---|---|
| 2.0% Stabaxol KE7646 | 95.5% | 1.5% | 1.96% | .98% |
| 4.0% Stabaxol KE7646 | 93.5% | 1.5% | 3.94% | .98% |

The black additive was carbon black in a polyester additive (purchased as ID. CEH-13LA from Polymer Compounding).

Figure 9:
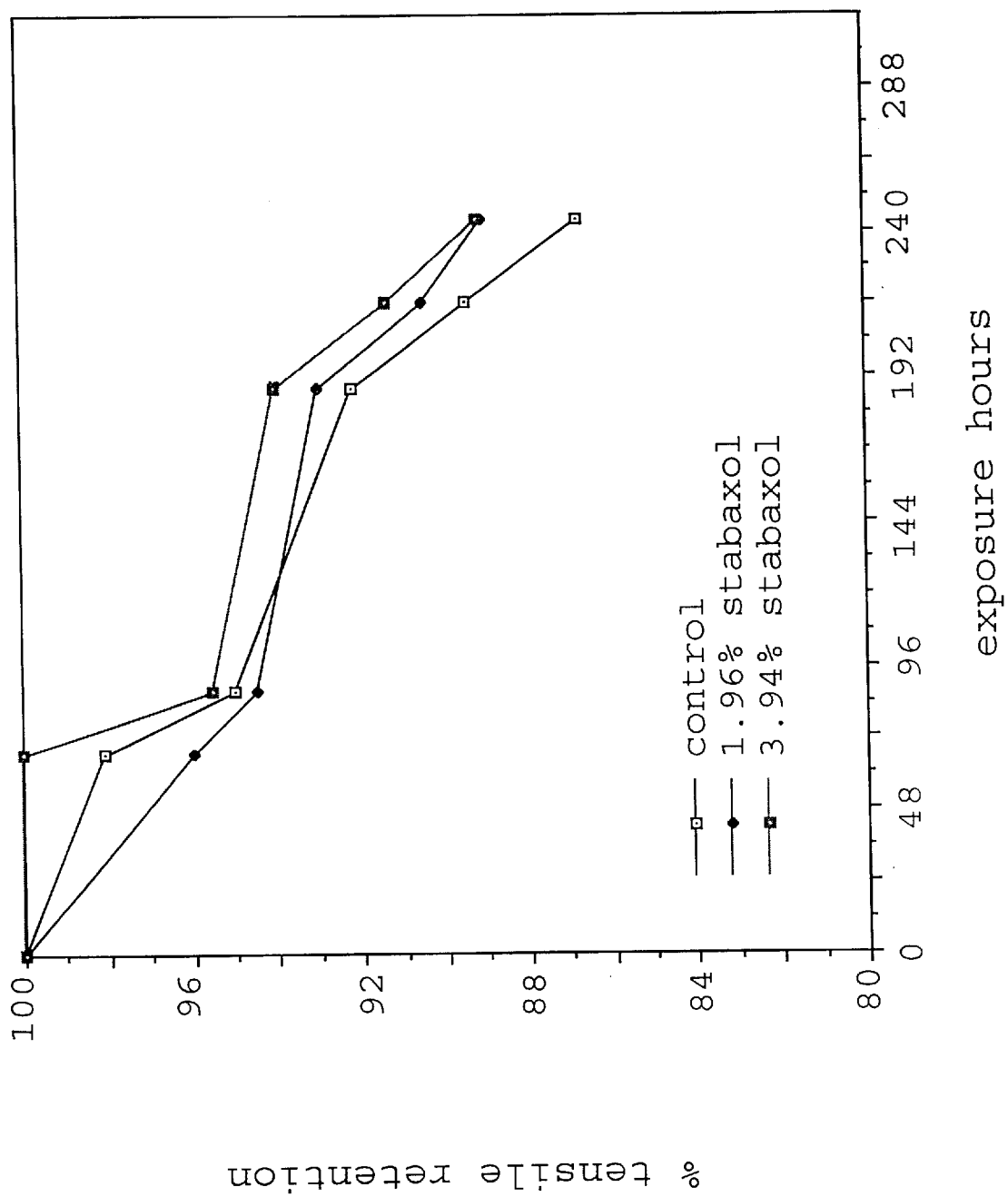
FIG. 9 presents in graph form the percent tensile strength retention as a function of time at 350° C. for yarn made with fresh PET and no recycled PET. Results are for 0% (control), 1.96%, and 3.94% Stabaxol KE7646.

The results are shown in FIG. 9. Very little effect due to added polycarbodiimide (a component of Stabaxol KE7646 masterbatch) was seen.

What is claimed is:

1. A yarn having sufficient heat stability and hydrolysis resistance for use in a papermaking fabric, said yarn formed from a blend comprising recycled polymer polyester, fresh polymer, and a polymeric stabilizer, wherein the recycled polymer polyester was reacted with the polymeric stabilizer so that the yarn is substantially free of unreacted carboxyl end groups.

2. The yarn claim 1 wherein the recycled polymer polyester was previously in the form of a yarn.

3. The yarn of claim 1 wherein the fresh polymer is a polyester.

4. The yarn of claim 1 wherein the yarn is for use as a papermaker's fabric selected from the group consisting of a forming fabric, a press fabric, and a dryer fabric.

5. The yarn of claim 1 wherein, on a weight basis, the recycled polymer accounts for at least 10% but less than 30% of the polymer blend.

6. The yarn of claim 5 wherein, on a weight basis, the recycled polymer accounts for about 20% of the polymer blend.

7. The yarn of claim 5 wherein the polymeric stabilizer is a polycarbodiimide.

8. The yarn of claim 7 wherein the stabilizer is a monomeric carbodiimide or biscarbodiimide.

9. The yarn of claim 7 wherein the monomeric carbodiimide or biscarbodiimide concentration is between 0.5% and 3.5% of the polymer blend.

10. The yarn of claim 5 wherein, on a weight basis, the polymeric stabilizer accounts for between 0.75% and 1.5% of the polymer blend.

11. The yarn of claim 1 wherein the fresh polymer is polyethylene terephthalate.

12. The yarn of claim 1 wherein the stabilizer is a monomeric carbodiimide or biscarbodiimide concentration amounting to between 2.0% and 2.5% of the polymer blend on a weight basis.

13. The yarn of claim 12 wherein the monomeric carbodiimide or biscarbodiimide concentration is about 2.0% of the polymer blend.

14. The yarn of claim 1 wherein, on a weight basis, the polymeric stabilizer accounts for about 1.1% of the polymer blend.

15. The yarn of claim 1 wherein the recycled polymer had previously been part of a papermaker's fabric selected from the group consisting of a forming fabric, a press fabric, and a dryer fabric.

16. The yarn of claim 15 wherein the recycled polymer had previously been part of a fabric that had been used in a papermaker's machine.

17. The yarn of claim 1 wherein it is a monofilament.

18. The yarn of claim 17 wherein the abrasion resistance of the yarn to 24-gauge wireless steel wires is less than that of an identical size yarn form from only fresh polymer.

19. The yarn of claim 18 wherein the recycled polymer and the fresh polymer are each a polyester.

20. The yarn of claim 18 wherein the abrasion resistance of the yarn to 24-gauge stainless steel wires is at least 10 percent less that of an identical size yarn made only with the fresh polymer.

* * * * *